Sept. 17, 1957          B. J. CRAIG          2,806,254
METHOD OF MAKING A COMPOSITION OF INDEPENDENTLY
COVERED PARTICLES
Original Filed June 9, 1944
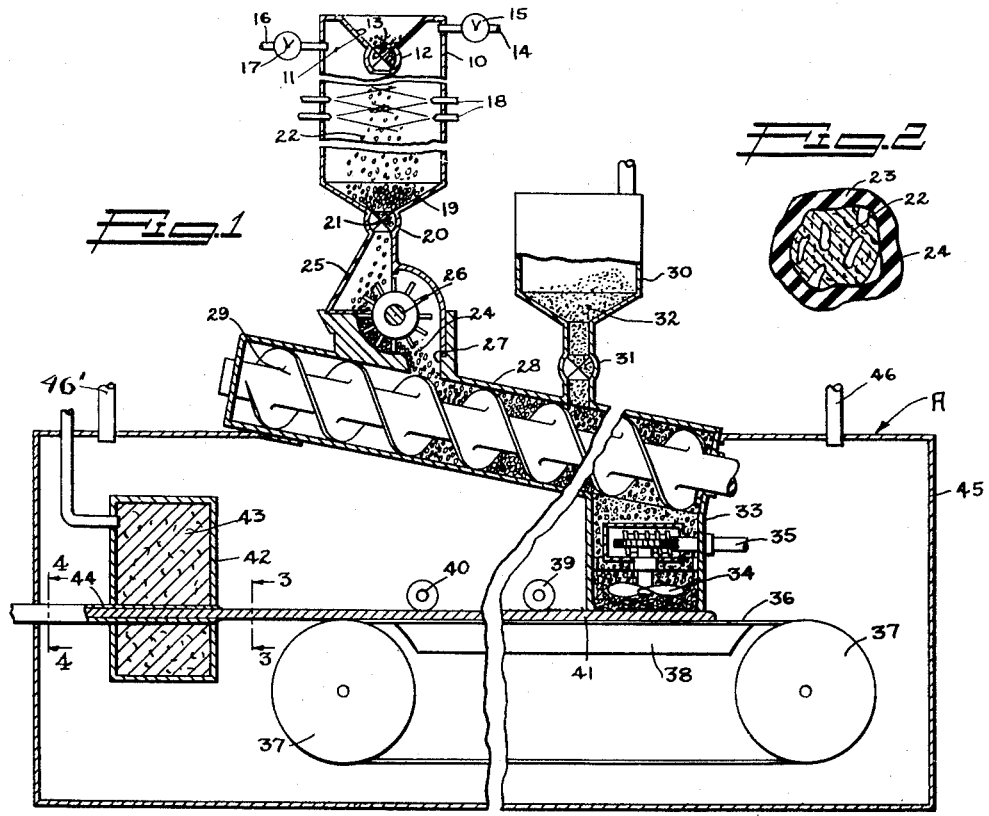
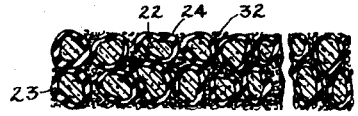
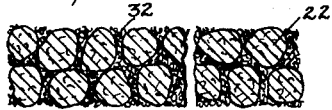
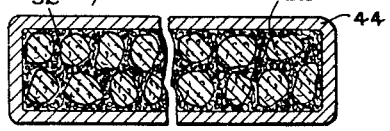
INVENTOR.
B. J. Craig

United States Patent Office 2,806,254
Patented Sept. 17, 1957

2,806,254

METHOD OF MAKING A COMPOSITION OF INDEPENDENTLY COVERED PARTICLES

Burnie J. Craig, Pasadena, Calif.

Original application June 9, 1944, Serial No. 539,589, now Patent No. 2,631,355, dated March 17, 1953. Divided and this application January 26, 1953, Serial No. 333,266

4 Claims. (Cl. 18—47.5)

In the manufacture of composition cork the comminuted cork is mixed with a binder and the mixture is fed to a suitable forming machine or die. Care must be taken to insure a thorough mixing and there should be no swelling or distorting of the cork particles or any premature insolubilizing of the binder.

Also, in manufacturing cork compositions, when the binder and cork particles are mixed, there is a tendency for the binder to enter the pores of the cork and remain in the pores and there is also a tendency for the binder to enter the pores during the molding or other treating of the composition in the steps of making the finished product.

It is one of the objects of this invention to provide a method for making a composite cork preparation which overcomes the difficulties mentioned.

A further object of the invention is to provide a novel method of making a cork composition wherein cork particles, while in an atmosphere of gas above atmospheric pressure, are mixed with a binder, after which the binder is insolubilized.

A further object of the invention is to provide a novel method wherein porous particles, while containing gas, are individually or in groups covered with a film which entraps the contained gas.

An additional object of the invention is to provide an improved method for making a cork composition wherein particles are provided with entrapped gas which may have a pressure greater than atmospheric pressure.

A further object of the invention is to provide a novel method of making a cork composition wherein cork particles, while containing a gas under pressure, are mixed with a binder and thereafter the pressure exterior to the composition is reduced to permit the entrapped gas to expand so that it tends to force binder from the pores of the cork particles.

A further object of the invention is to provide a novel method of making a cork composition wherein cork particles, while containing a gas under pressure, are mixed with a binder and thereafter the pressure exterior to the composition is reduced to less than that of the entrapped gas, this permitting the entrapped gas to expand and to force binder from the pores of the cork particles after which the binder is insolubilized.

Another object of the invention is to provide a novel method of making a cork composition wherein cork particles, while containing gas under pressure above atmospheric, are individually or in groups covered with a film which entraps the contained gas, after which the gas entrapping particles are secured together to form a composition or a thread-like member.

Another object of the invention is to provide a novel method of making a cork composition wherein cork particles, while containing gas under pressure above atmospheric, are individually or in groups covered with a film which entraps the contained gas, after which the gas entrapping particles are mixed with a binder under pressure conditions which may permit the entrapped gas to expand.

Other objects and advantages of the invention will be apparent from the following description taken in connection with the accompanying drawings, wherein:

Fig. 1 is a central sectional view through an apparatus embodying the features of the invention;

Fig. 2 is a sectional view showing one of the particles;

Fig. 3 is a section taken on line 3—3, Fig. 1, showing the material;

Fig. 4 is a section taken on line 4—4, Fig. 1, showing the material;

Fig. 5 is a view similar to Fig. 3, showing material when the individual covering for the particles is omitted, and Fig. 6 is a view similar to Fig. 4, showing material when the individual covering for the particles is omitted.

Referring to the drawing by reference characters, an apparatus embodying the features of the invention is indicated generally at A. This apparatus includes a housing 10, having a funnel shaped container 11 in the top thereof. The container has a cylindrical hopper portion 12 at the bottom thereof in which a rotating hopper gate 13 is mounted. The interior of the housing communicates with a gas pressure conduit 14 and with a constant pressure outlet valve 15 which determines the minimum air pressure within the housing 10. Also communicating with the interior of the housing 10 I show an outlet 16 with a constant pressure inlet valve 17 therein which determines the maximum pressure within the housing.

Extending into the housing I show a plurality of injection jets 18. The bottom of the housing is tapered inwardly as at 19 and has a cylindrical hopper portion 20 at the bottom thereof in which a rotating hopper gate 21 is mounted.

In operation, porous particles 22 are placed in the container 11 while gas under pressure is maintained within the housing 10 by means of the conduit 14 and is maintained at a desired pressure by means of the valves 15 and 17. As the rotating hopper gate 13 is rotated, the small particles of porous material are allowed to fall into the housing and through the path of the sprays where they become coated with covering material. As the particles fall they may be vulcanized or cured so that when the particles reach the bottom portion of the housing they may be removed by means of the rotating hopper gate 21. Thus it may be seen that compressed gas is entrapped in the pores of the porous particles and sealed therein by the coating of material 23 about each particle as shown in Fig. 2.

The members 24, formed as described, are compressible as well as resilient and elastic due to the contained gas and due to their natural properties.

The porous particles pass from the gate 21 to a discharge spout 25, whence they pass through a distributor 26 which is preferably regulated to run at a proper speed so that the particles are fed evenly. From the distributor 26 the particles pass through a discharge portion 27 into a cylindrical member 28 which contains a conveyor, shown as a rotating screw 29, which is suitably driven to rotate and to advance the particles 24 along the member 28.

A hopper 30, having a discharge feed valve 31, therein, communicates with the member 28. The hopper 30 receives a binder element 32 which is discharged on the particles within the member 28. The member 28 includes a discharge portion 33 which includes an impeller 34 driven by a suitable means 35. The impeller 34 agitates and forces along the mixture of binder and particles 24 and discharges the material into a conveyor 36 which runs over drums 37 whose upper reach is supported by a tablet 38. Rollers 39 and 40 serve to smooth the composition which is indicated at 41. The composition may advance through a coating chamber 42 which contains a coating or covering material 43. The chamber 42 has opposed slots of slightly greater area than the cross section area of the composition 41, so that the coating 44 is applied about the composition as the latter passes through the chamber 42.

The gas in the container 10 has a pressure preferably above that of the atmosphere and, since the parts are enclosed, the gas entrapped in the particles 24 has a pressure above atmospheric. The binder is fed into the chamber 28 under a pressure which is preferably equal to the pressure of the entrapped gas, so that upon the mixing of the binder and particles there is no tendency for a change in volume of the particles. The conveyor 36 and associated parts are arranged in a container 45 in which a finishing agent which may be an evaporative atmosphere and a coagulating bath may be maintained at a desired pressure by pipes 46 and 46'.

The pressure in the container 45 is preferably less than the pressure of the gas entrapped in the particles, so that when the plastic composition becomes subject to the pressure in the container 45 the drop in pressure will cause the particles to expand as the gas contained therein expands.

The manner in which the particles are united and/or treated and/or finished will depend upon the intended use of the finished composition. For example, in the composition shown in Fig. 3 the coated, gas entrapped members 24 are secured together by a binder 32, but there is no outside cover. Omission of a supply of coating material 43 provides this type. In Fig. 4 the composition is the same as that shown in Fig. 3 except that an outside coating 44 is provided. In Fig. 5 the coating 23 and coating 44 are omitted to provide a composition which includes air entrapped particles 22, held by a binder 32. In Fig. 6 the composition is the same as that shown in Fig. 5 except that an outside coating 44 is applied.

The porous particles may consist of comminuted cork, sponge rubber, wood pitch or natural sponge.

The entrapped gas may be air, nitrogen, hydrogen, oxygen or carbon dioxyde.

The covering material may be regenerated cellulose formed from viscose, lowly etherified or esterified cellulose derivatives, soluble in equeous alkaline solution such as lowly etherified methyl, ethyl or glycol cellulose, and lowly esterified cellulose acetate, highly esterified cellulose derivatives soluble in organic solvents such as cellulose acetate, cellulose propionate, cellulose acetate-propionate, methyl, ethyl, ethyl or benzyl cellulose, colloidal dispersions of proteins such as casein, gelatin and the like. Other material such as artificial resins of various kinds may be used.

The covering material might also be natural rubber or a synthetic of the butadiene co-polymer type such as Buna-A rubber, a synthetic of the chloroprene polymer type, such as neoprene, a synthetic of the isobutylene polymer type having small quantities of other diolefines such as isoprene or butadiene, such as Butyl rubber or a plasticized vinyl chloride polymer, such as Koroseal. The natural or artificial rubber may be employed in latex form with the latices applied to the particles in sufficient quantities to provide the necessary thickness.

The binder and/or the material which secures the particles to the core may be a thermo setting type such as urea, phenolic or alkyd resinous material or albumens or proteins treated with a material to insolubilize them upon heating, or other types of binders may be employed as, for example, raw natural rubber which may be vulcanized for the binding effect; also latices may be employed as binders and regenerated cellulose formed from viscose may be employed.

The covering material with the contained particles may be extruded into a coagulating bath or into an evaporating atmosphere so that the material will have the desired physical characteristics.

The core or tensile member may consist of a linen, cotton or silk thread or a rubber thread, or it may be made of wire such as copper.

This application is a division of application Ser. No. 539,589 filed June 9, 1944, now Patent No. 2,631,355, granted March 17, 1953.

Having thus described the invention, I claim:

1. The method of making a composition comprising moving porous compressible, flexible particles and separating the particles in the presence of a covering material to provide each particle with a complete independent covering, supplying a raw binder material which is of a character different from the covering material about each of the independently covered particles, compacting the covered particles into a mass, and thereafter curing the binder.

2. The method of making a composition comprising taking individual members which have surface voids therein, covering each of the members with an independent complete covering comprising a resin so that the resin will cover the entire surface and will close the voids comprising the members, curing the resin, incorporating the independent covered members in spaced apart relation and in a planar layer in a body of vulcanizable material which is of a character different from the resin to form a mass and thereafter compacting the mass and vulcanizing the vulcanizable material.

3. In the method of making a cork or the like composition wherein the particles are completely united, the steps of causing individual particles from a group of cork particles to be delivered at a controlled rate and in the form of an unsupported falling thin, continuous column into a treating zone and delivering a stream of binding material into said treating zone, the direction of the stream of treating material being such that it intersects the column of cork particles as the cork particles pass through the treating zone, the area of intersection of the cork particles with the material being such that said material is thoroughly distributed onto said unsupported and falling particles as said particles pass through said treating zone, and thereafter bringing the treated particles into proximity with the other treated particles from which they had been separated to reassemble the group, delivering said reassembled treated particles to a working zone and working the treated particles to form a mass and delivering the mass in a continuously moving column.

4. The method of making a composite structure having improved adhesion between contained independent particles and a body of rubber material, comprising completely coating each of the independent particles with a raw coating, curing the coatings on each of the independently coated particles, incorporating the independently cured coated particles into a body of vulcanizable rubber material which is of a character different from the raw coating, compacting the particles into a mass and thereafter vulcanizing the vulcanizable rubber material.

References Cited in the file of this patent

UNITED STATES PATENTS

| 1,689,584 | Grupe | Oct. 30, 1928 |
|---|---|---|
| 1,758,946 | Grupe | May 20, 1930 |
| 1,854,100 | Brito | Apr. 12, 1932 |
| 1,952,528 | Bedford | Mar. 27, 1934 |
| 2,054,210 | Weisenburg | Sept. 15, 1936 |
| 2,121,810 | McManus | June 28, 1938 |
| 2,365,508 | Austin | Dec. 19, 1944 |
| 2,561,392 | Marshall | July 24, 1951 |
| 2,631,355 | Craig | Mar. 17, 1953 |

OTHER REFERENCES

Ser. No. 314,347, Ricard (A. P. C.), published June 1, 1943.